(12) United States Patent
Li

(10) Patent No.: US 11,189,262 B2
(45) Date of Patent: Nov. 30, 2021

(54) METHOD AND APPARATUS FOR GENERATING MODEL

(71) Applicant: Baidu Online Network Technology (Beijing) Co., Ltd, Beijing (CN)

(72) Inventor: Chao Li, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 168 days.

(21) Appl. No.: 16/568,153

(22) Filed: Sep. 11, 2019

(65) Prior Publication Data
US 2020/0193969 A1   Jun. 18, 2020

(30) Foreign Application Priority Data

Dec. 18, 2018   (CN) .......................... 201811550080.2

(51) Int. Cl.
*G10L 15/22*   (2006.01)
*G10L 15/06*   (2013.01)
(Continued)

(52) U.S. Cl.
CPC ............ *G10L 15/063* (2013.01); *G10L 15/05* (2013.01); *G10L 15/183* (2013.01); *G10L 15/22* (2013.01)

(58) Field of Classification Search
CPC ....... G10L 15/063; G10L 15/22; G10L 15/02; G10L 25/30; G10L 15/16; G10L 25/84; G10L 15/00; G10L 15/07; G10L 15/183; G10L 15/05; G10L 15/04; G10L 15/06; G10L 15/08; G10L 15/144; G10L 15/197; G10L 15/26; G10L 15/285; G06N 3/08; G06N 3/0445; G06N 3/084; G06N 3/02; G06N 3/0454; G06N 5/046
(Continued)

(56) References Cited

U.S. PATENT DOCUMENTS 8,548,173 B2 * 10/2013  Noguchi .............. H03G 3/3005
                                                       381/56
9,202,464 B1 * 12/2015  Senior ...................... G06N 3/02
(Continued)

FOREIGN PATENT DOCUMENTS

| CN | 105118502 A | 12/2015 |
| CN | 108648769 A | 10/2018 |
| CN | 108922513 A | 11/2018 |

*Primary Examiner* — Vijay B Chawan
(74) *Attorney, Agent, or Firm* — Kilpatrick Townsend & Stockton LLP

(57) ABSTRACT

Method and apparatus for generating a model, and a method and apparatus for generating information are disclosed, an embodiment includes: acquiring a training sample set for an audio frame set, an audio frame in the audio frame set being in one-to-one correspondence with a training sample in the training sample set, the training sample in the training sample set including feature data and identification information of the audio frame in the audio frame set, and the identification information being used to identify a non-voice audio, a consonant audio and a vowel audio in the audio frame; and training to obtain a voice recognition model using a machine learning algorithm, by taking the feature data included in the training sample in the training sample set as an input, and the identification information corresponding to the input feature data as a desired output.

17 Claims, 5 Drawing Sheets

(51) Int. Cl.
*G10L 15/05* (2013.01)
*G10L 15/183* (2013.01)

(58) Field of Classification Search
USPC .............................. 704/210, 221, 225, 268
See application file for complete search history.

(56) References Cited

U.S. PATENT DOCUMENTS

| | | | | |
|---|---|---|---|---|
| 9,838,810 | B2* | 12/2017 | Singer | H04R 29/00 |
| 10,672,383 | B1* | 6/2020 | Thomson | G10L 15/183 |
| 10,847,179 | B2* | 11/2020 | Li | G10L 25/87 |
| 10,937,448 | B2* | 3/2021 | Li | G10L 25/84 |
| 2007/0243987 | A1* | 10/2007 | Anelli | B65H 45/22 |
| | | | | 493/254 |
| 2010/0189270 | A1* | 7/2010 | Noguchi | H03G 3/3005 |
| | | | | 381/56 |
| 2013/0223635 | A1* | 8/2013 | Singer | H04R 1/1041 |
| | | | | 381/56 |
| 2015/0340027 | A1* | 11/2015 | Wang | G10L 15/07 |
| | | | | 704/221 |
| 2016/0351197 | A1* | 12/2016 | Tan | G10L 17/08 |
| 2017/0116994 | A1* | 4/2017 | Wang | G10L 15/22 |
| 2018/0166066 | A1* | 6/2018 | Dimitriadis | G10L 25/78 |
| 2019/0325877 | A1* | 10/2019 | Li | G06N 3/08 |
| 2019/0362741 | A1* | 11/2019 | Li | G06N 3/08 |
| 2019/0385636 | A1* | 12/2019 | Li | G10L 15/02 |
| 2019/0392859 | A1* | 12/2019 | Li | G10L 15/063 |
| 2020/0098387 | A1* | 3/2020 | Hardek | G10L 25/51 |

* cited by examiner

METHOD AND APPARATUS FOR GENERATING MODEL

CROSS-REFERENCE TO RELATED APPLICATIONS

This application claims priority to Chinese Patent Application No. 201811550080.2, filed with the China National Intellectual Property Administration (CNIPA) on Dec. 18, 2018, the content of which is incorporated herein by reference in its entirety.

TECHNICAL FIELD

Embodiments of the present disclosure relate to the field of computer technology, specifically to a method and apparatus for generating a model.

BACKGROUND

An important point in voice interaction is that the position of the beginning and the end of the voice in an audio can be determined. In the prior art, typically, voice activity detection (VAD) is used for endpoints detection of voice. Voice activity detection, also known as voice endpoint detection and voice boundary detection, refers to detecting the presence or absence of voice in a noisy environment. Typically, voice activity detection may be used in voice processing systems such as voice coding and voice enhancement, to reduce the voice coding rate, save communication bandwidth, reduce mobile device energy consumption, improve the recognition rate, and the like.

At present, characteristics such as energy and zero-crossing rate are often used as input to a voice activity detection model, and manually determined rules are used to determine whether an audio frame is a voice audio.

SUMMARY

Embodiments of the present disclosure propose a method and apparatus for generating a model, and a method and apparatus for generating information.

In a first aspect, some embodiments of the present disclosure provide a method for generating a model, including: acquiring a training sample set for an audio frame set, an audio frame in the audio frame set being in one-to-one correspondence with a training sample in the training sample set, the training sample in the training sample set including feature data of the audio frame in the audio frame set and identification information of the audio frame in the audio frame set, the audio frame in the audio frame set including a voice audio, the voice audio including an consonant audio and a vowel audio, and the identification information being used to identify a non-voice audio, the consonant audio and the vowel audio in the audio frame; and training to obtain a voice recognition model using a machine learning algorithm, by taking the feature data included in the training sample in the training sample set as an input, and the identification information corresponding to the input feature data as a desired output.

In some embodiments, for the audio frame in the audio frame set, the identification information corresponding to the audio frame is obtained by: for a sub-audio included in the audio frame, in response to determining that the sub-audio belongs to the consonant audio, determining predetermined first identification information as identification information of the sub-audio; in response to determining that the sub-audio belongs to the vowel audio, determining predetermined second identification information as identification information of the sub-audio; or in response to determining that the sub-audio does not belong to the consonant audio and the sub-audio does not belong to the vowel audio, determining predetermined third identification information as identification information of the sub-audio; and combining identification information of sub-audios included in the audio frame to obtain the identification information of the audio frame.

In some embodiments, the training to obtain a voice recognition model using a machine learning algorithm, by taking the feature data included in the training sample in the training sample set as an input, and the identification information corresponding to the input feature data as a desired output, includes: selecting a training sample from the training sample set, and performing the following training steps of: inputting feature data included in the selected training sample to an initial voice recognition model to obtain an actual output, where the actual output is an output of the initial voice recognition model; determining whether the initial voice recognition model satisfies a predetermined end condition based on the actual output; and in response to determining that the end condition is satisfied, determining the initial voice recognition model satisfying the end condition as the voice recognition model obtained by training.

In some embodiments, the method further includes: in response to determining that the end condition is not satisfied, adjusting parameter values of model parameters of the initial voice recognition model based on the obtained actual output and a desired output corresponding to the obtained actual output, and selecting a never been selected training sample from the training sample set, continuing to perform the training steps based on the initial voice recognition model after the parameter values are adjusted.

In some embodiments, an activation function of an output layer included in the initial voice recognition model is a normalized exponential function, and a cost function of the output layer included in the initial voice recognition model is a cross entropy cost function.

In some embodiments, the voice recognition model is a cyclic neural network model having a gated loop unit.

In a second aspect, some embodiments of the present disclosure provide an apparatus for generating a model, including: a first acquisition unit, configured to acquire a training sample set for an audio frame set, an audio frame in the audio frame set being in one-to-one correspondence with a training sample in the training sample set, the training sample in the training sample set including feature data and identification information of the audio frame in the audio frame set, the audio frame in the audio frame set including a voice audio, the voice audio including an consonant audio and a vowel audio, and the identification information being used to identify a non-voice audio, the consonant audio and the vowel audio in the audio frame; and a training unit, configured to train to obtain a voice recognition model using a machine learning algorithm, by taking the feature data included in the training sample in the training sample set as an input, and the identification information corresponding to the input feature data as a desired output.

In some embodiments, for the audio frame in the audio frame set, the identification information corresponding to the audio frame obtained by the following steps: for a sub-audio included in the audio frame, in response to determining that the sub-audio belongs to the consonant audio, determining predetermined first identification information as identification information of the sub-audio; in response to determining that the sub-audio belongs to the vowel audio, determining predetermined second identification information as identification information of the sub-audio; or in response to determining that the sub-audio does not belong to the consonant audio, and the sub-audio does not belong to the vowel audio, determining predetermined third identification information as identification information of the sub-audio; and combining identification information of sub-audios included in the audio frame to obtain the identification information of the audio frame.

In some embodiments, the training unit includes: a training module, configured to select a training sample from the training sample set, and perform the following training steps of: inputting feature data included in the selected training sample to an initial voice recognition model to obtain an actual output, where the actual output is an output of the initial voice recognition model; determining whether the initial voice recognition model satisfies a predetermined end condition based on the actual output; and in response to determining that the end condition is satisfied, determining the initial voice recognition model satisfying the end condition as the voice recognition model obtained by training.

In some embodiments, the apparatus further includes: an adjusting unit, configured to, in response to determining that the end condition is not satisfied, adjust parameter values of model parameters of the initial voice recognition model based on the obtained actual output and a desired output corresponding to the obtained actual output, and select a never been selected training sample from the training sample set, continue to perform the training steps based on an initial voice recognition model after the parameter values are adjusted.

In some embodiments, an activation function of an output layer included in the initial voice recognition model is a normalized exponential function, and a cost function of the output layer included in the initial voice recognition model is a cross entropy cost function.

In some embodiments, the voice recognition model is a cyclic neural network model having a gated loop unit.

In a third aspect, some embodiments of the present disclosure provide a method for generating information, including: acquiring a target audio, the target audio including a voice audio; for an audio frame comprised in the target audio, inputting the audio frame into a pre-trained voice recognition model to obtain a probability that a sub-audio included in the audio frame belongs to a vowel audio, and a probability that the sub-audio included in the audio frame belongs to an consonant audio, the voice recognition model being obtained by training according to the method for generating a model of any one of the embodiments; and generating a voice endpoint detection result of the target audio based on the obtained probabilities and a predetermined probability threshold.

In some embodiments, the generating a voice endpoint detection result of the target audio based on the obtained probabilities and a predetermined probability threshold, includes: for the audio frame included in the target audio, summing the probability that the sub-audio included in the audio frame belongs to the vowel audio and the probability that the sub-audio included in the audio frame belongs to the consonant audio, and determining whether the audio frame includes a voice audio according to a magnitude relationship between the sum and the predetermined threshold; and generating the voice endpoint detection result of the target audio, based on a determination result of whether the audio frame included in the target audio includes the voice audio.

In a fourth aspect, some embodiments of the present disclosure provide an apparatus for generating information, including: a second acquisition unit, configured to acquire a target audio, the target audio including a voice audio; an input unit, configured to, for an audio frame comprised in the target audio, input the audio frame into a pre-trained voice recognition model, to obtain a probability that a sub-audio included in the audio frame belongs to a vowel audio, and a probability that the sub-audio included in the audio frame belongs to an consonant audio, the voice recognition model being obtained by training according to the method for generating a model of any one of the embodiments; and a generation unit, configured to generate a voice endpoint detection result of the target audio based on the obtained probabilities and a predetermined probability threshold.

In some embodiments, the generation unit includes: a determining module, configured to, for the audio frame included in the target audio, sum the probability that the sub-audio included in the audio frame belongs to the vowel audio and the probability that the sub-audio included in the audio frame belongs to the consonant audio, and determine whether the audio frame includes a voice audio according to a magnitude relationship between the sum and the predetermined threshold; and a generation module, configured to generate the voice endpoint detection result of the target audio, based on a determination result of whether the audio frame included in the target audio includes the voice audio.

In a fifth aspect, the embodiments of the present disclosure provide an electronic device, including: one or more processors; and a storage apparatus, storing one or more programs thereon, the one or more programs, when executed by the one or more processors, cause the one or more processors to implement the method for generating a model according to any one of the embodiments in the method, or cause the one or more processors to implement the method for generating information according to any one of the embodiments in the method.

In a sixth aspect, some embodiments of the present disclosure provide a computer readable medium, storing a computer program thereon, the program, when executed by a processor, implements the method for generating a model according to any one of the embodiments in the method, or, the program, when executed by a processor, implements the method for generating information according to any one of the embodiments in the method.

The method and apparatus for generating a model provided by some embodiments of the present disclosure, by acquiring a training sample set for an audio frame set, an audio frame in the audio frame set being in one-to-one correspondence with a training sample in the training sample set, the training sample in the training sample set including feature data and identification information of the audio frame in the audio frame set, the audio frame in the audio frame set including a voice audio, the voice audio including an consonant audio and a vowel audio, and the identification information being used to identify a non-voice audio, the consonant audio and the vowel audio in the audio frame, and then training to obtain a voice recognition model using a machine learning algorithm, by taking the feature data included in the training sample in the training sample set as an input, and the identification information corresponding to the input feature data as a desired output, thereby enriching the training method of the model and helping to improve the accuracy of voice endpoint detection.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of the present disclosure will be further described below in detail in combination with the accompanying drawings. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that some embodiments in the present disclosure and some features in the disclosure may be combined with each other on a non-conflict basis. Features of the present disclosure will be described below in detail with reference to the accompanying drawings and in combination with the embodiments.

Figure 1:
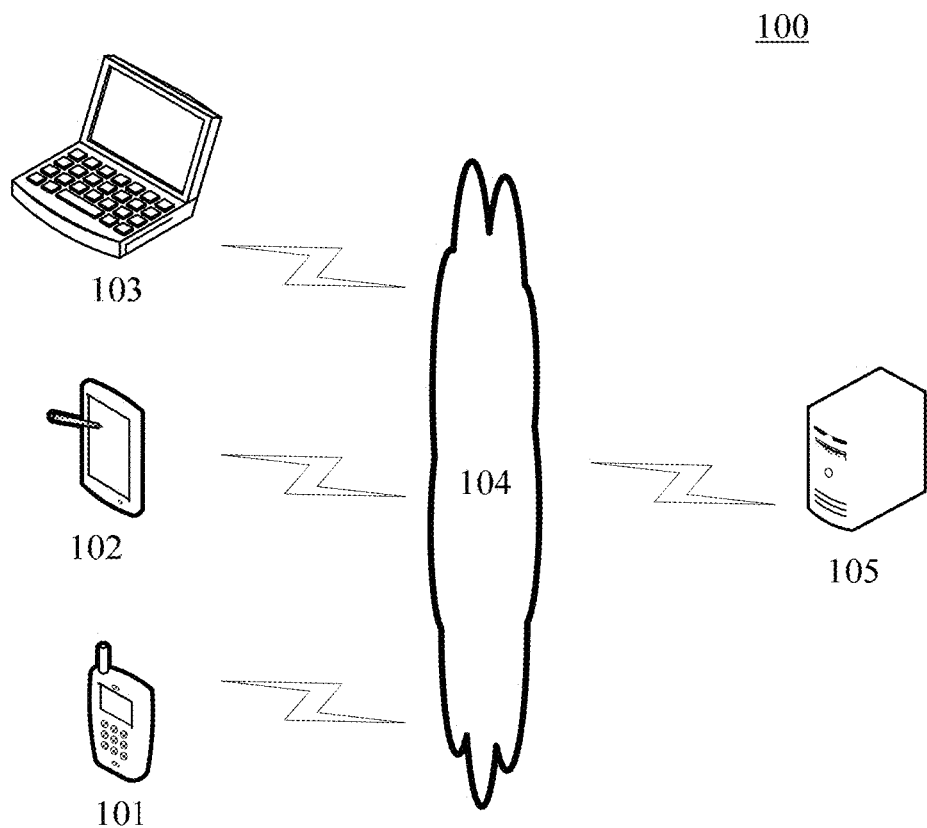
FIG. 1 is a diagram of an exemplary system architecture in which an embodiment of the present disclosure may be implemented.

FIG. 1 illustrates an exemplary system architecture 100 of an embodiment of a method for generating a model or an apparatus for generating a model, or, a method for generating information or an apparatus for generating information in which the embodiments of the present disclosure may be implemented.

As shown in FIG. 1, the system architecture 100 may include terminal devices 101, 102, 103, a network 104, and a server 105. The network 104 is used to provide a communication link medium between the terminal devices 101, 102, 103 and the server 105. The network 104 may include various types of connections, such as wired, wireless communication links, or optic fibers.

A user may interact with the server 105 through the network 104 using the terminal devices 101, 102, 103, to receive or send messages and the like. Various communication client applications, such as voice recognition applications, web browser applications, shopping applications, search applications, instant communication tools, mailbox clients, or social platform software, may be installed on the terminal devices 101, 102, and 103.

The terminal devices 101, 102, 103 may be hardware or software. When the terminal devices 101, 102, and 103 are hardware, they may be various electronic devices having audio transmission functions, including but not limited to smart phones, tablets, e-book readers, MP3 (Moving Picture Experts Group Audio Layer III) players, MP4 (Moving Picture Experts Group Audio Layer IV) players, laptop portable computers and desktop computers, and the like. When the terminal devices 101, 102, 103 are software, they may be installed in the above-listed electronic devices. They may be implemented as a plurality of software or software modules (for example, for providing distributed services) or as a single software or software module, which is not specifically limited herein.

The server 105 may be a server that provides various services, such as a backend server that provides support for audio transmitted by the terminal devices 101, 102, 103. The backend server may process such as perform audio feature extraction on the received audio and generate a processing result (for example, extracted audio features).

It should be noted that the method for generating a model provided by the embodiments of the present disclosure may be performed by the server 105, or may be performed by the terminal devices 101, 102, 103. Accordingly, the apparatus for generating a model may be provided in the server 105 or may be provided in the terminal devices 101, 102, 103. In addition, the method for generating information provided by the embodiments of the present disclosure may be performed by the server 105, or may be performed by the terminal devices 101, 102, 103. Accordingly, the apparatus for generating information may be provided in the server 105 or may be provided in the terminal devices 101, 102, 103. Here, an executive body of the method for generating a model may be the same as or different from an executive body of the method for generating information.

It should be noted that the server may be hardware or software. When the server is hardware, it may be implemented as a distributed server cluster composed of a plurality of servers, or may be implemented as a single server. When the server is software, it may be implemented as a plurality of software or software modules (for example, for providing distributed services), or as a single software or software module, which is not specifically limited herein.

It should be understood that the number of terminal devices, networks, and servers in FIG. 1 is merely illustrative. Depending on the implementation needs, there may be any number of terminal devices, networks, and servers. For example, when an electronic device on which the method for generating a model runs does not require data transmission with other electronic devices, the system architecture may include only the electronic device on which the method for generating a model runs.

Figure 2:
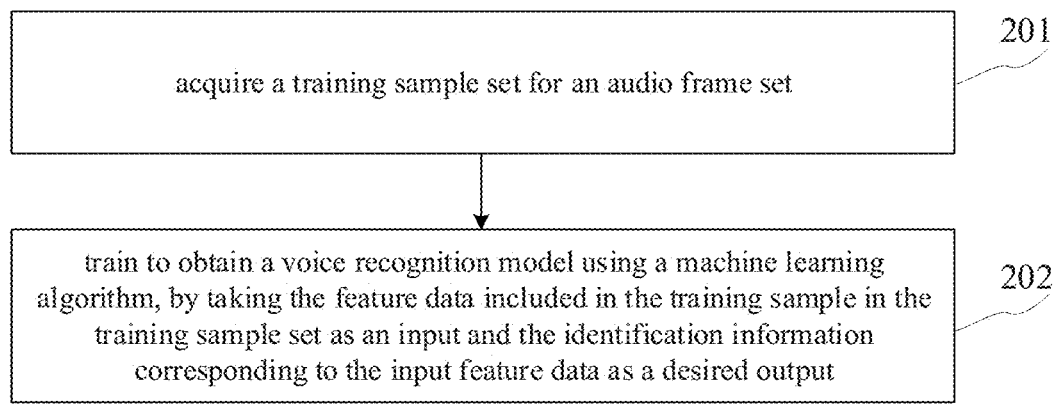
FIG. 2 is a flowchart of a method for generating a model according to an embodiment of the present disclosure.

With further reference to FIG. 2, a flow 200 of a method for generating a model according to an embodiment of the present disclosure is illustrated. The method for generating a model includes the following steps:

Step 201, acquiring a training sample set for an audio frame set.

In the present embodiment, an executive body of the method for generating a model (for example, the server or the terminal device shown in FIG. 1) may acquire the training sample set for the audio frame set from other electronic devices or locally through a wired connection or a wireless connection. An audio frame in the audio frame set is in one-to-one correspondence with a training sample in the training sample set. The training sample in the training sample set includes feature data and identification information of the audio frame in the audio frame set. The audio frame in the audio frame set includes a voice audio. A voice audio includes an consonant audio and a vowel audio. The identification information is used to identify a non-voice audio, the consonant audio and the vowel audio in the audio frame.

The audio frame in the audio frame set may be various audio frames including the voice audio. For example, the audio frame in the audio frame set may be a voice audio frame with noise, may also be an audio frame including mute and voice audio, or the like. Here, the length of the audio frame may be preset, for example, the frame length may be 32 milliseconds, 25 milliseconds, or the like.

The feature data may include, but is not limited to, data for at least one of the following characteristics of the audio: amplitude, frame rate, zero-crossing rate, short-term energy, or the like. As an example, the feature data may be 64-dimensional, Mel Bank Features.

The non-voice audio may be any audio other than voice audio. For example, when the audio frame in the audio frame set is a voice audio frame with noise, the non-voice audio may include the noise audio; when the audio frame in the audio frame set is an audio frame including mute and voice audio, the non-voice audio may include the mute audio.

The consonant audio may be the audio of a consonant. The vowel audio may be the audio of a vowel.

In some alternative implementations of the present embodiment, for an audio frame in the audio frame set, the identification information corresponding to the audio frame is obtained by the executive body or other electronic device in communication connection with the executive body through following steps:

The first step, for a sub-audio included in the audio frame, performing following substeps:

The first sub-step, in response to determining that the sub-audio belongs to the consonant audio, determining predetermined first identification information as identification information of the sub-audio.

The sub-audio may be an audio obtained by dividing the audio frame. For example, the audio frame may be equally divided into a predetermined number (e.g., 100, 200, etc.) of portions, to obtain the predetermined number of sub-audios. In addition, the audio frame may also be divided into sub-audios of a predetermined frame length (for example, 5 milliseconds, or 10 milliseconds), to obtain a plurality of sub-audios.

Here, the executive body or the electronic device in communication connection with the executive body may determine whether the sub-audio belongs to the consonant audio through various methods. For example, whether the sub-audio belongs to the consonant audio may be manually determined, or an existing alignment method (for example, an alignment method based on a GMM-HMM acoustic model) may be used to map the audio frame to a syllable to further determine whether the sub-audio included in the audio frame belongs to the consonant audio.

The first identification information may be predetermined identification, and the first identification information may be used to identify the consonant audio. For example, the first identification information may be "1".

The second sub-step, in response to determining that the sub-audio belongs to the vowel audio, determining predetermined second identification information as identification information of the sub-audio.

Here, the executive body or the electronic device in communication connection with the executive body may use various methods to determine whether the sub-audio belongs to the vowel audio. For example, whether the sub-audio belongs to the vowel audio may be manually determined, or an existing alignment method (for example, an alignment method based on a GMM-HMM acoustic model) may be used to map the audio frame to a syllable to further determine whether the sub-audio included in the audio frame belongs to the vowel audio.

The second identification information may be predetermined identification, and the second identification information may be used to identify the vowel audio. For example, the second identification information may be "2".

The third sub-step, in response to determining that the sub-audio does not belong to the consonant audio, and the sub-audio does not belong to the vowel audio, determining predetermined third identification information as identification information of the sub-audio.

The third identification information may be predetermined identification, and the third identification information may be used to identify audio that is neither a vowel audio nor an consonant audio (e.g., non-voice audio). For example, the third identification information may be "0".

It may be understood that the first identification information, the second identification information, and the third identification information may be set according to actual needs. Generally, the first identification information, the second identification information, and the third identification information are identification information different from each other. For example, the first identification information, the second identification information, and the third identification information may be represented by different symbols respectively.

The second step, combining identification information of the sub-audios included in the audio frame to obtain the identification information of the audio frame.

As an example, if the number of sub-audios included in the audio frame is 5, the identification information of the sub-audios is "0", "1", "2", "1", "0", respectively. Then, the identification information of the sub-audios included in the audio frame is combined, and the obtained identification information of the audio frame is "01210".

Alternatively, for an audio frame in the audio frame set, the identification information corresponding to the audio frame may also be obtained by manually labelling.

Step 202, training to obtain a voice recognition model using a machine learning algorithm, by taking the feature data included in the training sample in the training sample set as an input, and the identification information corresponding to the input feature data as a desired output.

In the present embodiment, the executive body may train to obtain the voice recognition model using the machine learning algorithm, by taking the feature data included in the training sample in the training sample set acquired in step 201 as the input, and the identification information corresponding to the input feature data as the desired output.

Specifically, the executive body may use the machine learning algorithm to train an consonant model (e.g., a cyclic neural network, or a convolutional neural network), by taking the feature data included in the training sample in the training sample set acquired in step 201 as the input and the identification information corresponding to the input feature data as the desired output. For the feature data input for each training, an actual output may be obtained. The actual output is an actual output of the consonant model and is used to characterize the identification information. Then, the executive body may adjust the parameters of the consonant model based on the actual output and the desired output by using a gradient descent method, and the model obtained after each adjustment of the parameters is used as the consonant model for a next training. In the case that a preset end condition is satisfied, end the training, thereby obtaining the voice recognition model by training.

Here, the executive body may use a batch training algorithm to train the consonant model, and may also use a random training algorithm to train the consonant model, which is not limited herein in the embodiments of the present disclosure.

It should be noted that the preset end condition may include, but is not limited to, at least one of the following: the training time exceeds a preset duration; the number of training times exceeds a preset number of times; or the calculated difference (e.g., the function value of a loss function) is less than a preset difference threshold.

It may be understood that an output layer included in the voice recognition model may have three nodes. During the use of the voice recognition model, the above three nodes may be used to output the probability that the audio frame includes a consonant audio, the probability that the audio frame includes a vowel audio, and the probability that the audio frame includes a non-speech audio, respectively.

In some alternative implementations of the present embodiment, the executive body may perform the step 202 according to the following steps:

selecting a training sample from the training sample set, and performing the following training steps:

first, inputting feature data included in the selected training sample to an initial voice recognition model to obtain an actual output.

Here, the actual output may be an output of the initial voice recognition model. The initial voice recognition model may be a model that is untrained, or trained but does not satisfy the end condition.

Then, determining whether the initial voice recognition model satisfies a predetermined end condition based on the actual output.

The predetermined end condition may include, but is not limited to, at least one of the following: the training time exceeds a preset duration; the number of training times exceeds a preset number of times; or the calculated difference (e.g., the function value of a loss function) is less than a preset difference threshold.

As an example, when the predetermined end condition is "the number of training times exceeds a preset number of times", the executive body may determine the obtained number of the actual output as the number of training times, if the obtained number of the actual output (i.e., training times) exceeds the preset number of times, it may be determined that the initial voice recognition model satisfies the predetermined end condition. When the predetermined end condition is "the function value of the calculated loss function is less than a preset difference threshold", the executive body may calculate the function value of the predetermined loss function based on the obtained actual output and the desired output corresponding to the obtained actual output. If the function value of the calculated loss function is less than the preset difference threshold, it may be determined that the initial voice recognition model satisfies the predetermined end condition.

Finally, in response to determining that the end condition is satisfied, determining the initial voice recognition model satisfying the end condition as the voice recognition model obtained by training.

In some alternative implementations of the present embodiment, in response to determining that the end condition is not satisfied, the executive body may also adjust parameter values of model parameters of the initial voice recognition model based on the obtained actual output and the desired output corresponding to the obtained actual output, and select a never been selected training sample from the training sample set, continue to perform the training steps based on the initial voice recognition model after the parameter values are adjusted.

Here, the executive body may adjust the parameter values of the model parameters of the initial voice recognition model by calculating a gradient value of the gradient of the actual output and the desired output corresponding to the obtained actual output using a back propagation method. Specifically, the executive body may calculate the gradient value using an analytical method, or calculate the gradient value using a numerical gradient calculation method, and then adjust the parameter values of the model parameters of the initial voice recognition model based on the calculated gradient value.

It should be noted that the method for adjusting the parameter values of the model parameters by using the gradient value is a well-known technology widely studied by those skilled in the art, and detailed description thereof will be omitted.

In some alternative implementations of the present embodiment, an activation function of an output layer included in the initial voice recognition model is a normalized exponential function, and a cost function of the output layer included in the initial voice recognition model is a cross entropy cost function.

It may be understood that using the normalized exponential function as the activation function of the output layer may obtain the probability corresponding to the respective identification information (i.e., the probability that the sub-audio belongs to non-voice audio, the probability that the sub-audio belongs to the consonant audio, and the probability that the sub-audio belongs to the vowel audio). Using the cross entropy cost function as the cost function of the output layer usually leads to a better training effect, for example, the training is faster.

In some alternative implementations of the present embodiment, the initial voice recognition model may be a cyclic neural network model having a gated loop unit. Therefore, the voice recognition model obtained by training may be the cyclic neural network model having the gated loop unit.

Here, the voice recognition model obtained by training with the cyclic neural network model having the gated loop unit being used as the initial voice recognition model, compared with the voice recognition model obtained by training using other models as the initial voice recognition model, may have faster computational efficiency.

Alternatively, the initial voice recognition model may also be a cyclic neural network, a convolutional neural network, or the like.

Figure 3:
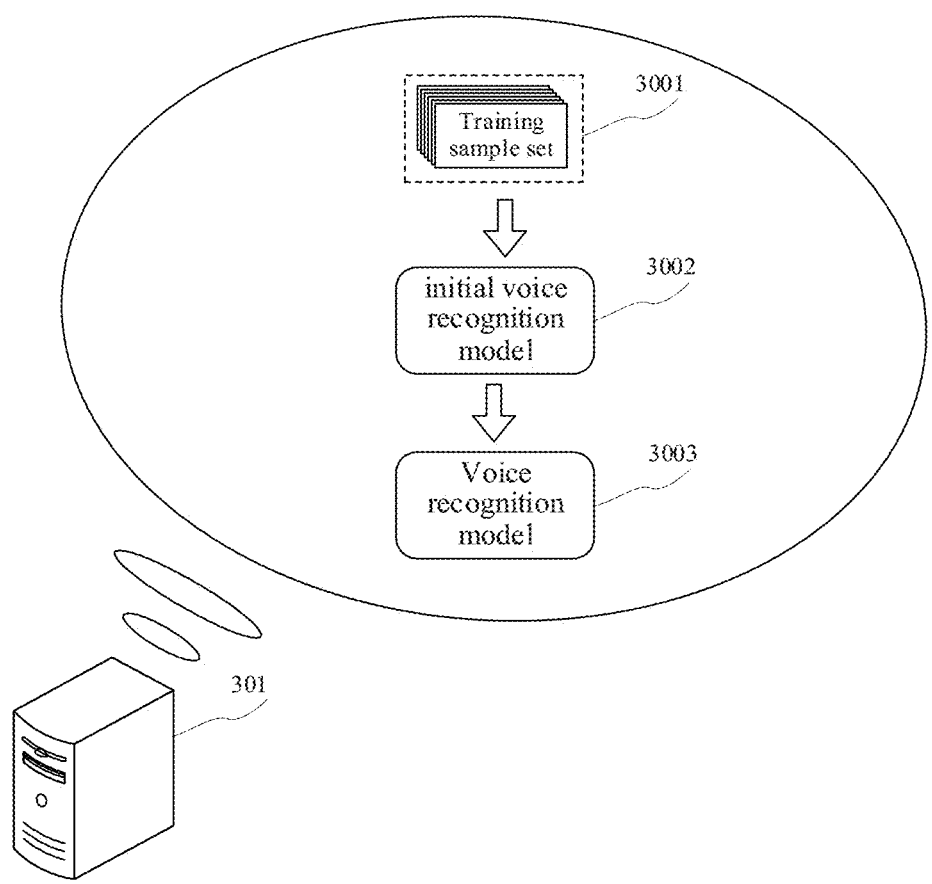
FIG. 3 is a schematic diagram of an application scenario of the method for generating a model according to the present embodiment.

With further reference to FIG. 3, FIG. 3 is a schematic diagram of an application scenario of the method for generating a model according to the present embodiment. In the application scenario of FIG. 3, a server 301 first acquires a training sample set 3001 for an audio frame set. An audio frame in the audio frame set is in one-to-one correspondence with a training sample in the training sample set, and the training sample in the training sample set includes the feature data and the identification information of the audio frame in the audio frame set. The audio frame in the audio frame set includes a voice audio. The voice audio includes an consonant audio and a vowel audio. The identification information is used to identify non-voice audio, the consonant audio and the vowel audio in the audio frame. Then, the server 301 trains to obtain a voice recognition model 3003 using a machine learning algorithm, by taking the feature data included in the training sample in the training sample set as an input of an initial voice recognition model 3002 (e.g., a cyclic neural network model having a gated loop unit), and the identification information corresponding to the input feature data as a desired output of the initial model 3002.

The method provided by the above embodiment of the present disclosure, by: acquiring a training sample set for an audio frame set, an audio frame in the audio frame set being in one-to-one correspondence with a training sample in the training sample set, the training sample in the training sample set including feature data and identification information of the audio frame in the audio frame set, the audio frame in the audio frame set including a voice audio, the voice audio including an consonant audio and a vowel audio, and the identification information being used to identify a non-voice audio, the consonant audio and the vowel audio in the audio frame; and then training to obtain a voice recognition model using a machine learning algorithm, by taking the feature data included in the training sample in the training sample set as an input and the identification information corresponding to the input feature data as a desired output. So that the voice recognition model is trained by the training sample including the feature data including the consonant audio and the vowel audio and the corresponding identification information, enriching the training method of the model. In addition, the voice recognition model obtained by training is used, which may improve the accuracy of voice endpoint detection.

Figure 4:
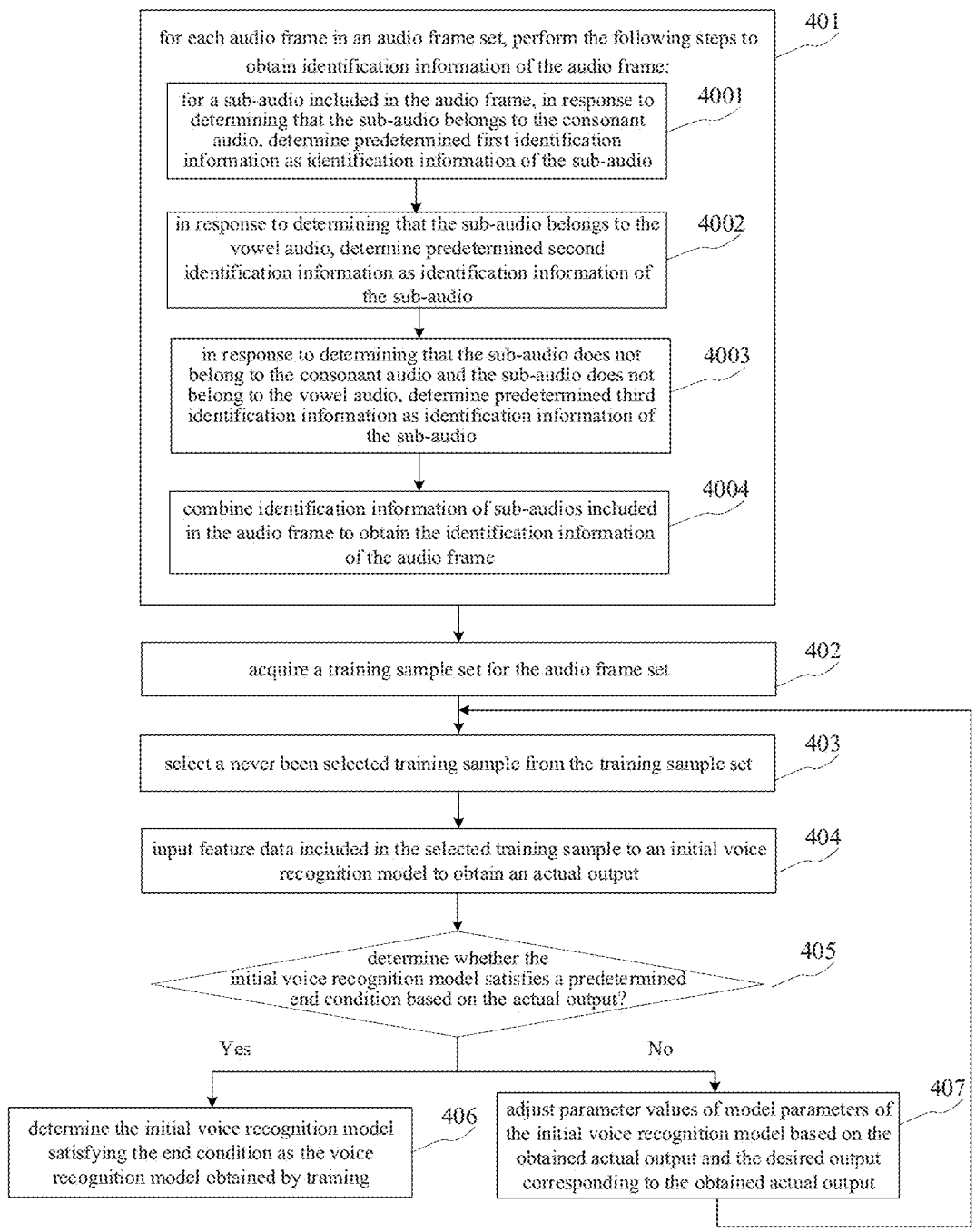
FIG. 4 is a flowchart of the method for generating a model according to another embodiment of the present disclosure.

With further reference to FIG. 4, a flow 400 of another embodiment of the method for generating a model is illustrated. The flow 400 of the method for generating a model includes the following steps:

Step 401, for each of the audio frames in an audio frame set, performing the following steps (including step 4001—step 4004) to obtain identification information of the audio frame. After that, performing step 402.

In the present embodiment, an executive body of the method for generating a model (for example, the server or the terminal device shown in FIG. 1) may store the audio frame set in advance, or acquire the audio frame set from an electronic device in communication connection with the executive body. Thus, for each of the audio frames in the audio frame set, the executive body performs the following steps (including step 4001—step 4004) to obtain the identification information of the audio frame.

The audio frame in the audio frame set may be various audio frames including the voice audio. For example, the audio frame in the audio frame set may be a voice audio frame with noise, may also be an audio frame including mute and voice audio, or the like. Here, the length of the audio frame may be preset, for example, the frame length may be 32 milliseconds, 25 milliseconds, or the like.

The identification information may be used to identify non-voice audio, consonant audio and vowel audio in the audio frame.

The non-voice audio may be any audio other than voice audio. For example, when the audio frame in the audio frame set is a voice audio frame with noise, the non-voice audio may include the noise audio; when the audio frame in the audio frame set is an audio frame including mute and voice audio, the non-voice audio may include the mute audio.

The consonant audio may be the audio of the consonant. The vowel audio may be the audio of the vowel.

Step 4001, for a sub-audio included in the audio frame, in response to determining that the sub-audio belongs to the consonant audio, determining predetermined first identification information as identification information of the sub-audio.

In the present embodiment, for the sub-audio included in the audio frame, in the case where it is determined that the sub-audio belongs to the consonant audio, the executive body may determine the predetermined first identification information as the identification information of the sub-audio.

The sub-audio may be an audio obtained by dividing the audio frame. For example, the audio frame may be equally divided into a predetermined number (e.g., 100, 200, etc.) of portions, thereby to obtain the predetermined number of sub-audios. In addition, the audio frame may also be divided into sub-audios of a predetermined frame length (for example, 5 milliseconds, 10 milliseconds), thereby to obtain a plurality of sub-audios.

Here, the executive body or the electronic device in communication connection with the executive body may determine whether the sub-audio belongs to the consonant audio using various methods. For example, whether the sub-audio belongs to the consonant audio may be manually determined, or an existing alignment method (for example, an alignment method based on a GMM-HMM acoustic model) may be used to map the audio frame to a syllable to further determine whether the sub-audio included in the audio frame belongs to the consonant audio.

The first identification information may be predetermined identification, and the first identification information may be used to identify the consonant audio. For example, the first identification information may be "1".

Step 4002, in response to determining that the sub-audio belongs to the vowel audio, determining predetermined second identification information as identification information of the sub-audio.

In the present embodiment, in the case where it is determined that the sub-audio belongs to the vowel audio, the executive body may determine the predetermined second identification information as the identification information of the sub-audio.

Here, the executive body or the electronic device in communication connection with the executive body may use various methods to determine whether the sub-audio belongs to the vowel audio. For example, whether the sub-audio belongs to the vowel audio may be manually determined, or an existing alignment method (for example, an alignment method based on a GMM-HMM acoustic model) may be used to map the audio frame to a syllable to further determine whether the sub-audio included in the audio frame belongs to the vowel audio.

The second identification information may be predetermined identification, and the second identification information may be used to identify the vowel audio. For example, the second identification information may be "2".

Step 4003, in response to determining that the sub-audio does not belong to the consonant audio and the sub-audio does not belong to the vowel audio, determining predetermined third identification information as identification information of the sub-audio.

In the present embodiment, in the case where it is determined that the sub-audio does not belong to the consonant audio and the sub-audio does not belong to the vowel audio, the executive body may determine the predetermined third identification information as the identification information of the sub-audio.

The third identification information may be predetermined identification, and the third identification information may be used to identify audio that is neither a vowel audio nor an consonant audio (e.g., non-voice audio). For example, the third identification information may be "0".

It may be understood that the first identification information, the second identification information, and the third identification information may be set according to actual needs. Generally, the first identification information, the second identification information, and the third identification information are identification information different from each other. For example, the first identification information, the second identification information, and the third identification information may be represented by different symbols respectively.

Step 4004, combining identification information of sub-audios included in the audio frame to obtain the identification information of the audio frame.

In the present embodiment, the executive body may combine the identification information of the sub-audios included in the audio frame to obtain the identification information of the audio frame.

As an example, if the number of sub-audios included in the audio frame is 5, the identification information of the sub-audios is "0", "1", "2", "1", "0", respectively. Then, the identification information of the sub-audios included in the audio frame is combined, and the obtained identification information of the audio frame is "01210".

Step 402, acquiring a training sample set for the audio frame set. After that, performing step 403.

In the present embodiment, the executive body may acquire the training sample set for the audio frame set. An audio frame in the audio frame set is in one-to-one correspondence with a training sample in the training sample set. The training sample in the training sample set includes feature data and identification information of the audio frame in the audio frame set. An audio frame in the audio frame set includes a voice audio. The voice audio includes an consonant audio and a vowel audio. The identification information is used to identify a non-voice audio, the consonant audio and the vowel audio in the audio frame.

The feature data may include, but is not limited to, data for at least one of the following characteristics of the audio: amplitude, frame rate, zero-crossing rate, short-term energy, or the like.

Step 403, selecting a never been selected training sample from the training sample set. After that, performing step 404.

In the present embodiment, the executive body may select the never been selected training sample from the training sample set.

Step 404, inputting feature data included in the selected training sample to an initial voice recognition model to obtain an actual output. After that, performing step 405.

In the present embodiment, the executive body may input the feature data included in the selected training sample to the initial voice recognition model to obtain the actual output.

Here, the actual output may be an output of the initial voice recognition model. The initial voice recognition model may be a model that is untrained, or trained but does not satisfy an end condition.

Step 405, determining whether the initial voice recognition model satisfies a predetermined end condition based on the actual output. After that, if yes, performing step 406; or if not, performing step 407.

In the present embodiment, the executive body may determine whether the initial voice recognition model satisfies the predetermined end condition based on the actual output.

The predetermined end condition may include, but is not limited to, at least one of the following: the training time exceeds a preset duration; the number of training times exceeds a preset number of times; or the calculated difference (e.g., the function value of a loss function) is less than a preset difference threshold.

As an example, when the predetermined end condition is "the number of training times exceeds a preset number of times", the executive body may determine the obtained number of the actual output as the number of training times. If the obtained number of the actual output (i.e., training times) exceeds the preset number of times, it may be determined that the initial voice recognition model satisfies the predetermined end condition. When the predetermined end condition is "the function value of the calculated loss function is less than a preset difference threshold", the executive body may calculate the function value of the predetermined loss function based on the obtained actual output and the desired output corresponding to the obtained actual output. If the function value of the calculated loss function is less than the preset difference threshold, it may be determined that the initial voice recognition model satisfies the predetermined end condition.

Step 406, determining the initial voice recognition model satisfying the end condition as the voice recognition model obtained by training.

In the present embodiment, the executive body may determine the initial voice recognition model satisfying the end condition as the voice recognition model obtained by training.

Step 407, adjusting parameter values of model parameters of the initial voice recognition model based on the obtained actual output and the desired output corresponding to the obtained actual output. After that, performing step 403.

In the present embodiment, the executive body may adjust the parameter values of the model parameters of the initial voice recognition model based on the obtained actual output and the desired output corresponding to the obtained actual output.

Here, the executive body may adjust the parameter values of the model parameters of the initial voice recognition model, by calculating a gradient value of the gradient of the actual output and the desired output corresponding to the actual output obtained using a back propagation method. Specifically, the executive body may calculate the gradient value using an analytical method, or calculate the gradient value using a numerical gradient calculation method, and then adjust the parameter values of the model parameters of the initial voice recognition model by using the calculated gradient value.

It should be noted that the method for adjusting the parameter values of the model parameters by using the gradient value is a well-known technology widely studied by those skilled in the art, and detailed description thereof will be omitted.

It may be understood that, after performing step 407, when it is necessary to input the feature data included in the training sample again, the feature data may be input to the parameter-adjusted initial voice recognition model to obtain the actual output again, thereby performing iteration until the initial voice recognition model satisfies the end condition.

As can be seen from FIG. 4, the flow 400 of the method for generating a model in the present embodiment highlights the step of obtaining the identification information, as compared with the embodiment corresponding to FIG. 2. Thus, the solution described in the present embodiment uses a method of identifying the consonant audio and the vowel audio respectively to train the voice recognition model. Therefore, the voice recognition model obtained by training may determine whether voice audio is included in the audio, as well as the location of the voice audio in the audio more accurately.

Figure 5:
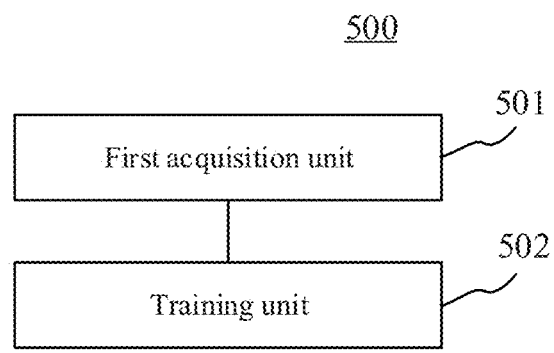
FIG. 5 is a schematic structural diagram of an apparatus for generating a model according to an embodiment of the present disclosure.

With further reference to FIG. 5, as an implementation of the method shown in the above figures, the present disclosure provides an embodiment of an apparatus for generating a model, and the apparatus embodiment corresponds to the method embodiment as shown in FIG. 2. In addition to the features described below, the apparatus embodiment may also include the same or corresponding features as the method embodiment shown in FIG. 2. The apparatus may be specifically applied to various electronic devices.

As shown in FIG. 5, an apparatus 500 for generating a model of the present embodiment includes: a first acquisition unit 501 and a training unit 502. The first acquisition unit 501 is configured to acquire a training sample set for an audio frame set, an audio frame in the audio frame set being in one-to-one correspondence with a training sample in the training sample set, the training sample in the training sample set including feature data and identification information of the audio frame in the audio frame set, the audio frame in the audio frame set including a voice audio, the voice audio including an consonant audio and a vowel audio, and the identification information being used to identify a non-voice audio, the consonant audio and the vowel audio in the audio frame. The training unit 502 is configured to train to obtain a voice recognition model using a machine learning algorithm, by taking the feature data included in the training sample in the training sample set as an input, and the identification information corresponding to the input feature data as a desired output.

In the present embodiment, the first acquisition unit 501 of the apparatus 500 for generating a model may acquire the training sample set for the audio frame set from other electronic devices or locally through a wired connection or a wireless connection. An audio frame in the audio frame set is in one-to-one correspondence with a training sample in the training sample set. The training sample in the training sample set includes feature data and identification information of the audio frame in the audio frame set. The audio frame in the audio frame set includes a voice audio. The voice audio includes an consonant audio and a vowel audio. The identification information is used to identify a non-voice audio, the consonant audio and the vowel audio in the audio frame.

The audio frame in the audio frame set may be various audio frames including the voice audio. For example, the audio frame in the audio frame set may be a voice audio frame with noise, may also be an audio frame including mute and voice audio, or the like. Here, the length of the audio frame may be preset, for example, the frame length may be 32 milliseconds, 25 milliseconds, or the like.

The feature data may include, but is not limited to, data for at least one of the following characteristics of the audio: amplitude, frame rate, zero-crossing rate, short-term energy, or the like.

The non-voice audio may be any audio other than voice audio. For example, when the audio frame in the audio frame set is a voice audio frame with noise, the non-voice audio may include the noise audio; when the audio frame in the audio frame set is an audio frame including mute and voice audio, the non-voice audio may include the mute audio.

The consonant audio may be the audio of the consonant. The vowel audio may be the audio of the vowel.

In the present embodiment, the training unit 502 may use the machine learning algorithm, take the feature data included in the training sample in the training sample set acquired in step 201 as the input, the identification information corresponding to the input feature data as the desired output, to train an consonant model (e.g., a cyclic neural network, a convolutional neural network). For the feature data input for each training, an actual output may be obtained. The actual output is an actual output of the consonant model and is used to characterize the identification information. Then, the executive body may adjust the parameters of the consonant model based on the actual output and the desired output using a gradient descent method, and use the model obtained after each adjustment of the parameters as the consonant model for a next training, and in the case that a preset end condition is satisfied, end the training, thereby obtaining the voice recognition model by training.

Here, the executive body may use a batch training algorithm to train the consonant model, and may also use a random training algorithm to train the consonant model, which is not limited herein in the embodiments of the present disclosure.

It should be noted that the preset end condition may include, but is not limited to, at least one of the following: the training time exceeds a preset duration; the number of training times exceeds a preset number of times; or the calculated difference (e.g., the function value of a loss function) is less than a preset difference threshold.

In some alternative implementations of the present embodiment, for the audio frame in the audio frame set, the identification information corresponding to the audio frame obtained by the following steps: for a sub-audio included in the audio frame, in response to determining that the sub-audio belongs to the consonant audio, determining predetermined first identification information as identification information of the sub-audio; in response to determining that the sub-audio belongs to the vowel audio, determining predetermined second identification information as identification information of the sub-audio; or in response to determining that the sub-audio does not belong to the consonant audio, and the sub-audio does not belong to the vowel audio, determining predetermined third identification information as identification information of the sub-audio; and combining identification information of sub-audios included in the audio frame to obtain the identification information of the audio frame.

In some alternative implementations of the present embodiment, the training unit 502 includes: a training module (not shown in the figure), configured to select a training sample from the training sample set, and perform training steps of: inputting feature data included in the selected training sample to an initial voice recognition model to obtain an actual output, where the actual output is an output of the initial voice recognition model; determining whether the initial voice recognition model satisfies a predetermined end condition based on the actual output; and in response to determining that the end condition is satisfied, determining the initial voice recognition model satisfying the end condition as the voice recognition model obtained by training.

In some alternative implementations of the present embodiment, the apparatus 500 further includes: an adjusting unit (not shown in the figure), configured to, in response to determining that the end condition is not satisfied, adjust parameter values of model parameters of the initial voice recognition model based on the obtained actual output and a desired output corresponding to the obtained actual output, and select a never been selected training sample from the training sample set, continue to perform the training steps based on the initial voice recognition model after the parameter values are adjusted.

In some alternative implementations of the present embodiment, an activation function of an output layer included in the initial voice recognition model is a normalized exponential function, and a cost function of the output layer included in the initial voice recognition model is a cross entropy cost function.

In some alternative implementations of the present embodiment, the voice recognition model is a cyclic neural network model having a gated loop unit.

In the apparatus provided by the above embodiment of the present disclosure, the first acquisition unit 501 acquires a training sample set for an audio frame set, an audio frame in the audio frame set being in one-to-one correspondence with a training sample in the training sample set, the training sample in the training sample set including feature data and identification information of the audio frame in the audio frame set, the audio frame in the audio frame set including a voice audio, the voice audio including an consonant audio and a vowel audio, and the identification information being used to identify a non-voice audio, the consonant audio and the vowel audio in the audio frame, and then the training unit 602 trains to obtain a voice recognition model using a machine learning algorithm, by taking the feature data included in the training sample in the training sample set as an input, and the identification information corresponding to the input feature data as a desired output, so that the voice recognition model is trained by the training sample including the feature data including the consonant audio and the vowel audio and the corresponding identification information, enriching the training method of the model. In addition, the voice recognition model obtained by training is used, which may improve the accuracy of voice endpoint detection.

Figure 6:
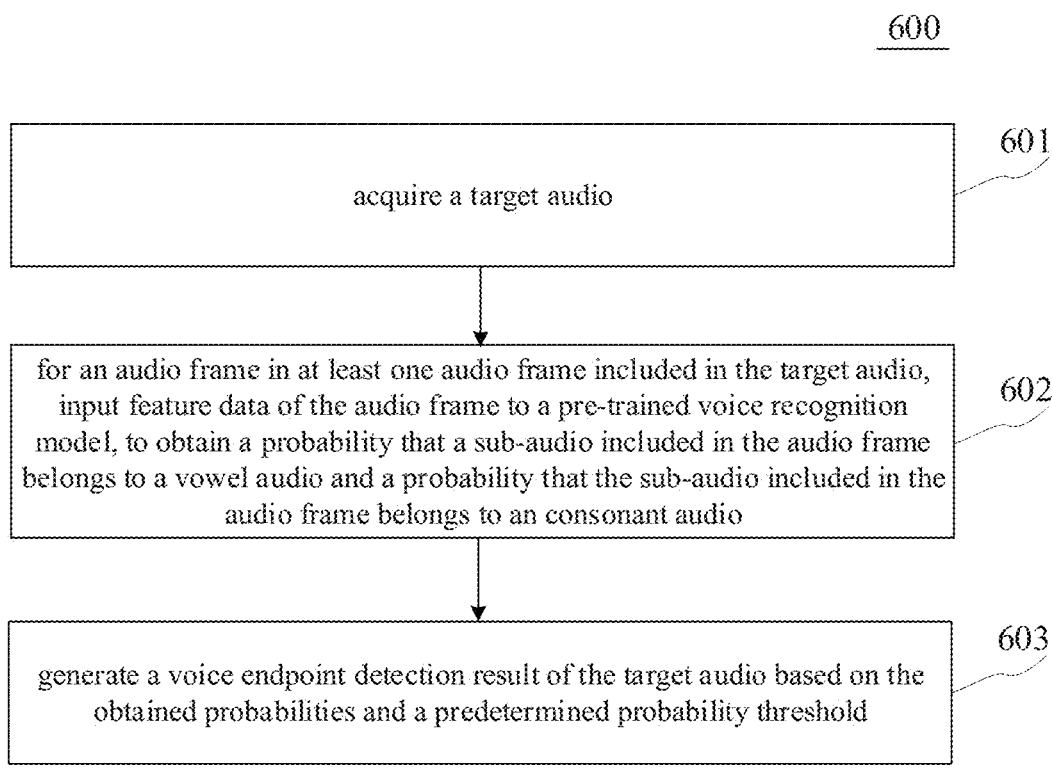
FIG. 6 is a flowchart of a method for generating information according to an embodiment of the present disclosure.

With further reference to FIG. 6, a flow 600 of a method for generating information according to an embodiment of the present disclosure is illustrated. The method for generating information includes the following steps:

Step 601, acquiring a target audio.

In the present embodiment, an executive body of the method for generating information (for example, the server or the terminal device shown in FIG. 1) may acquire the target audio from other electronic devices or locally through a wired connection or a wireless connection. The target audio may be various audios including a voice audio.

Step 602, for an audio frame in at least one audio frame included in the target audio, inputting feature data of the audio frame to a pre-trained voice recognition model, to obtain a probability that a sub-audio included in the audio frame belongs to a vowel audio, and a probability that the sub-audio included in the audio frame belongs to an consonant audio.

In the present embodiment, for an audio frame in the at least one audio frame included in the target audio, the executive body may input the feature data of the audio frame into the pre-trained voice recognition model, to obtain the probability that the sub-audio included in the audio frame belongs to the vowel audio and the probability that the sub-audio included in the audio frame belongs to the consonant audio. The voice recognition model may be obtained by training by the executive body or an electronic device in communication connection with the executive body according to any one of the embodiments in the method for generating a model as shown in FIG. 2.

It may be understood that, generally, the voice recognition model obtained according to the above training method may output the probability that the sub-audio included in the audio frame belongs to the vowel audio and the probability that the sub-audio included in the audio frame belongs to the consonant audio during the actual use.

Step 603, generating a voice endpoint detection result of the target audio based on the obtained probabilities and a predetermined probability threshold.

In the present embodiment, the executive body may generate the voice endpoint detection result of the target audio based on the obtained probabilities and the predetermined probability threshold.

The voice endpoint detection result may be used to indicate the start position and the end position of the voice audio included in the target audio.

In some alternative implementations of the present embodiment, the executive body may perform the above step 603 as follows:

First, for the audio frame included in the target audio, the probability that the sub-audio included in the audio frame belongs to the vowel audio and the probability that the sub-audio included in the audio frame belongs to the consonant audio are summed, and whether the audio frame includes the voice audio is determined according to a magnitude relationship between the obtained sum and the predetermined threshold. For example, if the obtained sum is greater than or equal to the predetermined probability threshold, the executive body may determine that the audio frame includes the voice audio; and if the obtained sum is less than the predetermined probability threshold, the executive body may determine that the audio frame does not include the voice audio.

Then, the voice endpoint detection result of the target audio is generated, based on a determination result of whether the audio frame included in the target audio includes the voice audio.

As an example, the executive body may first determine the first and last audio frame including voice audios in an audio frame sequence, the audio frame sequence being included in the target audio and indicated by the determination result of whether the voice audio includes the audio frame of the voice audio, and determine the determined first audio frame including a voice audio as the start position of the voice audio included in the target audio, and determine the determined last audio frame including a voice audio as the end position of the voice audio included in the target audio, thus obtaining the voice endpoint detection result.

Alternatively, the executive body may directly determine the determination result as the voice endpoint detection result. For example, given the target audio is composed of 10 audio frames, and the second to ninth audio frames include voice audio, while the first and tenth audio frames do not include voice audio. Then, the executive body may generate a sequence {0, 1, 1, 1, 1, 1, 1, 1, 1, 0, } which represents the above result, where the first element in the sequence is used to indicate whether the first audio frame included in the target audio includes a voice audio, and the second element in the sequence may be used to indicate whether the second audio frame included in the target audio includes a voice audio, and so on. "0" may characterize that a voice audio is not included, and "1" may characterize that a voice audio is included. Thus, the executive body may directly determine the sequence {0, 1, 1, 1, 1, 1, 1, 1, 1, 0} as the voice endpoint detection result. In this application scenario, through the voice endpoint detection result, it may be determined that the target audio is composed of 10 audio frames. The second to ninth audio frames include voice audio, and the first and tenth audio frames do not include voice audio.

Alternatively, the executive body may first determine a greater probability in the probability that a sub-audio included in an audio frame belongs to the vowel audio and the probability that the sub-audio included in the audio frame belongs to the consonant audio, and then determine a magnitude relationship between the greater probability and the predetermined probability threshold, thereby generating the voice endpoint detection result of the target audio.

The method provided by the above embodiment of the present disclosure, by acquiring a target audio, the target audio including a voice audio, then for an audio frame included in the target audio, inputting the audio frame into a pre-trained voice recognition model to obtain a probability that a sub-audio included in the audio frame belongs to a vowel audio and a probability that the sub-audio included in the audio frame belongs to an consonant audio, the voice recognition model being obtained by training according to any one of the embodiments in the method for generating a model, and finally generating a voice endpoint detection result of the target audio based on the obtained probabilities and a predetermined probability threshold. Therefore, the voice recognition model is applied to voice endpoint detection, which improves the accuracy of voice endpoint detection and enriches the method of voice endpoint detection.

Figure 7:
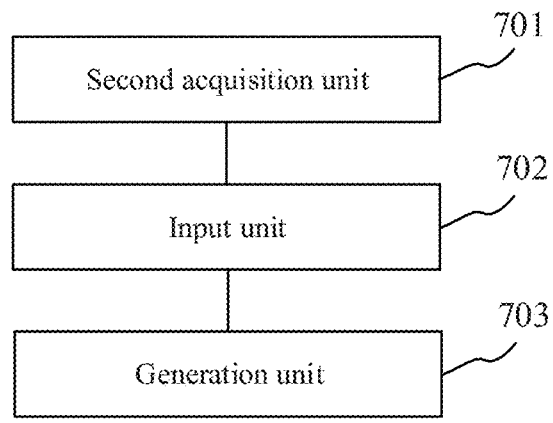
FIG. 7 is a schematic structural diagram of an apparatus for generating information according to an embodiment of the present disclosure.

With further reference to FIG. 7, as an implementation of the method shown in the above figures, the present disclosure provides an embodiment of an apparatus for generating information, and the apparatus embodiment corresponds to the method embodiment as shown in FIG. 6. In addition to the features described below, the apparatus embodiment may also include the same or corresponding features as the method embodiment shown in FIG. 6. The apparatus may be specifically applied to various electronic devices.

As shown in FIG. 7, an apparatus 700 for generating information of the present embodiment includes: a second acquisition unit 701, an input unit 702 and a generation unit 703. The second acquisition unit 701 is configured to acquire a target audio, the target audio including a voice audio. The input unit 702 is configured to, for an audio frame comprised in the target audio, input the audio frame into a pre-trained voice recognition model, to obtain a probability that a sub-audio included in the audio frame belongs to a vowel audio, and a probability that the sub-audio included in the audio frame belongs to an consonant audio, the voice recognition model being obtained by training according to any one of the embodiments in the method for generating a model. The generation unit 703 is configured to generate a voice endpoint detection result of the target audio based on the obtained probabilities and a predetermined probability threshold.

In the present embodiment, the second acquisition unit 701 of the apparatus 700 for generating information may acquire the target audio from other electronic devices or locally through a wired connection or a wireless connection.

The target audio may be various audios including a voice audio.

In the present embodiment, for the audio frame in the at least one audio frame included in the target audio acquired by the second acquisition unit 701, the input unit 702 may input the feature data of the audio frame to the pre-trained voice recognition model, to obtain the probability that the sub-audio included in the audio frame belongs to the vowel audio and the probability that the sub-audio included in the audio frame belongs to the consonant audio. The voice recognition model may be obtained by training by the executive body or an electronic device in communication connection with the executive body according to any one of the embodiments in the method for generating a model as shown in FIG. 2.

In the present embodiment, based on the probabilities obtained by the input unit 702, the generation unit 703 may generate the voice endpoint detection result of the target audio. The voice endpoint detection result may be used to indicate the start position and the end position of the voice audio included in the target audio.

In some alternative implementations of the present embodiment, the generation unit 703 includes: a determining module (not shown in the figure), configured to, for the audio frame included in the target audio, sum the probability that the sub-audio included in the audio frame belongs to the vowel audio and the probability that the sub-audio included in the audio frame belongs to the consonant audio, and determine whether the audio frame includes a voice audio according to a magnitude relationship between the sum and the predetermined threshold; and a generation module (not shown in the figure), configured to generate the voice endpoint detection result of the target audio, based on a determination result of whether the audio frame included in the target audio includes the voice audio.

In the apparatus provided by the above embodiment of the present disclosure, the second acquisition unit 701 acquires a target audio, the target audio including a voice audio, then the input unit 702 inputs the audio frame to a pre-trained voice recognition model, for an audio frame included in the target audio, to obtain a probability that a sub-audio included in the audio frame belongs to a vowel audio and a probability that the sub-audio included in the audio frame belongs to an consonant audio, the voice recognition model being obtained by training according to any one of the embodiments in the method for generating a model, and finally the generation unit 703 generates a voice endpoint detection result of the target audio based on the obtained probabilities and a predetermined probability threshold. Therefore, the voice recognition model is applied to voice endpoint detection, which improves the accuracy of voice endpoint detection and enriches the method of voice endpoint detection.

Figure 8:
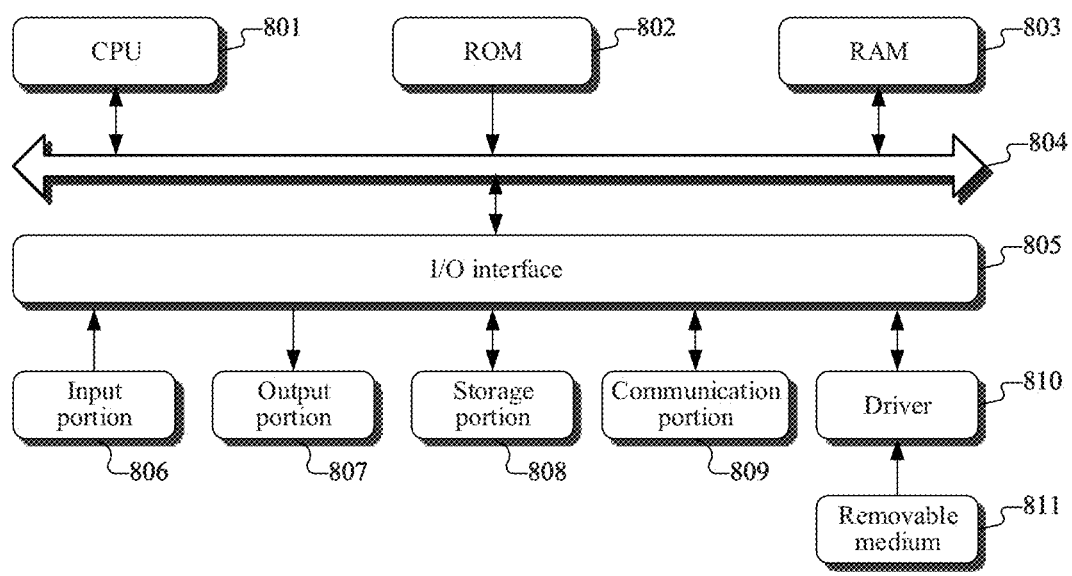
FIG. 8 is a schematic structural diagram of a computer system adapted to implement an electronic device of the embodiments of the present disclosure.

With further reference to FIG. 8, a schematic structural diagram of a computer system 800 adapted to implement an electronic device of the embodiments of the present disclosure is shown. The electronic device shown in FIG. 8 is merely an example, and should not impose any limitation on the function and scope of use of the embodiments of the present disclosure.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including such as a keyboard, a mouse; an output portion 807 including such as a cathode ray tube (CRT), a liquid crystal display device (LCD), a speaker, etc.; a storage portion 808 including a hard disk and the like; and a communication portion 809 including a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810, to facilitate the retrieval of a computer program from the removable medium 811, and the installation thereof on the storage portion 808 as needed.

In particular, according to the embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication portion 809, and/or may be installed from the removable medium 811. The computer program, when executed by the central processing unit (CPU) 801, implements the above mentioned functionalities as defined by the method of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination of any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which may be used by a command execution system, apparatus or element or incorporated thereto. In the present disclosure, the computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Python, Java, Smalltalk, C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the accompanying drawings. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system performing specified functions or operations, or by a combination of a dedicated hardware and computer instructions.

The units involved in the embodiments of the present disclosure may be implemented by means of software or hardware. The described units may also be provided in a processor, for example, may be described as: a processor including a first acquisition unit and a training unit. Here, the names of these units do not in some cases constitute limitations to such units themselves. For example, the first acquisition unit may also be described as "a unit configured to acquire a training sample set for an audio frame set".

In another aspect, the present disclosure further provides a computer readable medium. The computer readable medium may be included in the electronic device in the above described embodiments, or a stand-alone computer readable medium not assembled into the electronic device. The computer readable medium carries one or more programs. The one or more programs, when executed by the electronic device, cause the electronic device to: acquire a training sample set for an audio frame set, an audio frame in the audio frame set being in one-to-one correspondence with a training sample in the training sample set, the training sample in the training sample set including feature data and identification information of the audio frame in the audio frame set, the audio frame in the audio frame set including a voice audio, the voice audio including an consonant audio and a vowel audio, and the identification information being used to identify a non-voice audio, the consonant audio and the vowel audio in the audio frame; and train to obtain a voice recognition model using a machine learning algorithm, by taking the feature data included in the training sample in the training sample set as an input, and the identification information corresponding to the input feature data as a desired output.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for generating a voice recognition model, the method comprising:
acquiring a training sample set for an audio frame set, an audio frame in the audio frame set being in one-to-one correspondence with a training sample in the training sample set, the training sample in the training sample set comprising feature data of the audio frame in the audio frame set and identification information of the audio frame in the audio frame set, the audio frame in the audio frame set comprising a voice audio, the voice audio comprising a consonant audio and a vowel audio, and the identification information being used to identify a non-voice audio, the consonant audio and the vowel audio in the audio frame; and
training to obtain the voice recognition model using a machine learning algorithm, by taking the feature data comprised in the training sample in the training sample set as an input, and the identification information corresponding to the input feature data as a desired output;
wherein, for the audio frame in the audio frame set, the identification information corresponding to the audio frame is obtained by:
for a sub-audio comprised in the audio frame, in response to determining that the sub-audio belongs to the consonant audio, determining predetermined first identification information as identification information of the sub-audio; in response to determining that the sub-audio belongs to the vowel audio, determining predetermined second identification information as identification information of the sub-audio; or in response to determining that the sub-audio does not belong to the consonant audio and the sub-audio does not belong to the vowel audio, determining predetermined third identification information as identification information of the sub-audio; and
combining identification information of sub-audios comprised in the audio frame to obtain the identification information of the audio frame.

2. The method according to claim 1, wherein training to obtain the voice recognition model using the machine learning algorithm, by taking the feature data comprised in the training sample in the training sample set as the input, and the identification information corresponding to the input feature data as the desired output comprises:
selecting the training sample from the training sample set; and
performing following training steps:
inputting the feature data comprised in the selected training sample to an initial voice recognition model to obtain an actual output, wherein the actual output is an output of the initial voice recognition model;
determining whether the initial voice recognition model satisfies a predetermined end condition based on the actual output; and
in response to determining that the predetermined end condition is satisfied, determining the initial voice recognition model satisfying the predetermined end condition as the voice recognition model obtained by training.

3. The method according to claim 2, wherein the method further comprises:
in response to determining that the predetermined end condition is not satisfied, adjusting parameter values of model parameters of the initial voice recognition model based on the obtained actual output and the desired output corresponding to the obtained actual output;
selecting a never been selected training sample from the training sample set; and
continuing to perform the training steps based on the initial voice recognition model after the parameter values are adjusted.

4. The method according to claim 2, wherein an activation function of an output layer comprised in the initial voice recognition model is a normalized exponential function, and a cost function of the output layer comprised in the initial voice recognition model is a cross entropy cost function.

5. The method according to claim 1, wherein the voice recognition model is a cyclic neural network model having a gated loop unit.

6. A method for generating a voice endpoint detection result of a target audio, the method comprising:
acquiring the target audio, the target audio comprising a voice audio;
for an audio frame comprised in the target audio, inputting the audio frame into a pre-trained voice recognition model, to obtain a probability of a sub-audio comprised in the audio frame belonging to a vowel audio, and a probability of the sub-audio comprised in the audio frame belonging to a consonant audio, the voice recognition model being obtained by training according to the method of claim 1; and
generating the voice endpoint detection result of the target audio based on the obtained probabilities and a predetermined probability threshold.

7. The method according to claim 6, wherein generating the voice endpoint detection result of the target audio based on the obtained probabilities and the predetermined probability threshold comprises:
for the audio frame comprised in the target audio:
summing the probability of the sub-audio comprised in the audio frame belonging to the vowel audio and the probability of the sub-audio comprised in the audio frame belonging to the consonant audio; and
determining whether the audio frame comprises a voice audio according to a magnitude relationship between the sum and the predetermined probability threshold; and
generating the voice endpoint detection result of the target audio, based on a determination result of whether the audio frame comprised in the target audio comprises the voice audio.

8. An apparatus for generating a voice recognition model, the apparatus comprising:
at least one processor; and
a memory storing instructions, the instructions when executed by the at least one processor, cause the at least one processor to perform operations, the operations comprising:
acquiring a training sample set for an audio frame set, an audio frame in the audio frame set being in one-to-one correspondence with a training sample in the training sample set, the training sample in the training sample set comprising feature data of the audio frame in the audio frame set and identification information of the audio frame in the audio frame set, the audio frame in the audio frame set comprising a voice audio, the voice audio comprising a consonant audio and a vowel audio, and the identification information being used to identify a non-voice audio, the consonant audio and the vowel audio in the audio frame; and training to obtain the voice recognition model using a machine learning algorithm, by taking the feature data comprised in the training sample in the training sample set as an input, and the identification information corresponding to the input feature data as a desired output;

wherein, for the audio frame in the audio frame set, the identification information corresponding to the audio frame is obtained by:

for a sub-audio comprised in the audio frame, in response to determining that the sub-audio belongs to the consonant audio, determining predetermined first identification information as identification information of the sub-audio; in response to determining that the sub-audio belongs to the vowel audio, determining predetermined second identification information as identification information of the sub-audio; or in response to determining that the sub-audio does not belong to the consonant audio and the sub-audio does not belong to the vowel audio, determining predetermined third identification information as identification information of the sub-audio; and combining identification information of sub-audios comprised in the audio frame to obtain the identification information of the audio frame.

9. The apparatus according to claim 8, wherein training to obtain the voice recognition model using the machine learning algorithm, by taking the feature data comprised in the training sample in the training sample set as the input, and the identification information corresponding to the input feature data as the desired output comprises:

selecting a training sample from the training sample set; and performing following training steps:

inputting the feature data comprised in the selected training sample to an initial voice recognition model to obtain an actual output, wherein the actual output is an output of the initial voice recognition model;

determining whether the initial voice recognition model satisfies a predetermined end condition based on the actual output; and in response to determining that the predetermined end condition is satisfied, determining the initial voice recognition model satisfying the predetermined end condition as the voice recognition model obtained by training.

10. The apparatus according to claim 9, wherein the operations further comprise:

in response to determining that the predetermined end condition is not satisfied, adjusting parameter values of model parameters of the initial voice recognition model based on the obtained actual output and the desired output corresponding to the obtained actual output;

selecting a never been selected training sample from the training sample set; and continuing to perform the training steps based on the initial voice recognition model after the parameter values are adjusted.

11. The apparatus according to claim 9, wherein an activation function of an output layer comprised in the initial voice recognition model is a normalized exponential function, and a cost function of the output layer comprised in the initial voice recognition model is a cross entropy cost function.

12. The apparatus according to claim 8, wherein the voice recognition model is a cyclic neural network model having a gated loop unit.

13. An apparatus for generating a voice endpoint detection result of a target audio, the apparatus comprising:

at least one processor; and a memory storing instructions, the instructions when executed by the at least one processor, cause the at least one processor to perform operations, the operations comprising:

acquiring the target audio, the target audio comprising a voice audio;

for an audio frame comprised in the target audio, inputting the audio frame into a pre-trained voice recognition model, to obtain a probability of a sub-audio comprised in the audio frame belonging to a vowel audio, and a probability of the sub-audio comprised in the audio frame belonging to a consonant audio, the voice recognition model being obtained by training according to the operations of claim 9; and generating the voice endpoint detection result of the target audio based on the obtained probabilities and a predetermined probability threshold.

14. The apparatus according to claim 13, wherein generating the voice endpoint detection result of the target audio based on the obtained probabilities and the predetermined probability threshold comprises:

for the audio frame comprised in the target audio:

summing the probability of the sub-audio comprised in the audio frame belonging to the vowel audio and the probability of the sub-audio comprised in the audio frame belonging to the consonant audio; and determining whether the audio frame comprises a voice audio according to a magnitude relationship between the sum and the predetermined probability threshold; and generating the voice endpoint detection result of the target audio, based on a determination result of whether the audio frame comprised in the target audio comprises the voice audio.

15. A non-transitory computer readable medium storing a computer program thereon for generating a voice recognition model, the computer program, when executed by a processor, causes the processor to perform operations, the operations comprising:

acquiring a training sample set for an audio frame set, an audio frame in the audio frame set being in one-to-one correspondence with a training sample in the training sample set, the training sample in the training sample set comprising feature data of the audio frame in the audio frame set and identification information of the audio frame in the audio frame set, the audio frame in the audio frame set comprising a voice audio, the voice audio comprising a consonant audio and a vowel audio, and the identification information being used to identify a non-voice audio, the consonant audio and the vowel audio in the audio frame; and training to obtain the voice recognition model using a machine learning algorithm, by taking the feature data comprised in the training sample in the training sample set as an input, and the identification information corresponding to the input feature data as a desired output;

wherein, for the audio frame in the audio frame set, the identification information corresponding to the audio frame is obtained by:

for a sub-audio comprised in the audio frame, in response to determining that the sub-audio belongs to the consonant audio, determining predetermined first identification information as identification information of the sub-audio; in response to determining that the sub-audio belongs to the vowel audio, determining predetermined second identification information as identification information of the sub-audio; or in response to determining that the sub-audio does not belong to the consonant audio and the sub-audio does not belong to the vowel audio, determining predetermined third identification information as identification information of the sub-audio; and combining identification information of sub-audios comprised in the audio frame to obtain the identification information of the audio frame.

16. The medium according to claim 15, wherein training to obtain the voice recognition model using the machine learning algorithm, by taking the feature data comprised in the training sample in the training sample set as the input, and the identification information corresponding to the input feature data as the desired output comprises:

selecting a training sample from the training sample set; and performing following training steps:
inputting the feature data comprised in the selected training sample to an initial voice recognition model to obtain an actual output, wherein the actual output is an output of the initial voice recognition model;
determining whether the initial voice recognition model satisfies a predetermined end condition based on the actual output; and
in response to determining that the predetermined end condition is satisfied, determining the initial voice recognition model satisfying the predetermined end condition as the voice recognition model obtained by training.

17. The medium according to claim 16, wherein the operations further comprise:

in response to determining that the predetermined end condition is not satisfied, adjusting parameter values of model parameters of the initial voice recognition model based on the obtained actual output and the desired output corresponding to the obtained actual output;

selecting a never been selected training sample from the training sample set; and continuing to perform the training steps based on the initial voice recognition model after the parameter values are adjusted.

* * * * *